W. Hoyt.
Inclined Railroad.
Nº 6,321.   Patented Apr. 17, 1849.

W. Hoyt.

Inclined Railroad.

№ 6,321.   Patented Apr. 17, 1849.

UNITED STATES PATENT OFFICE.

WILLIAM HOYT, OF DUPONT, INDIANA.

COG-GEARING OF LOCOMOTIVES FOR ASCENDING INCLINED PLANES.

Specification of Letters Patent No, 6,321, dated April 17, 1849.

*To all whom it may concern:*

Be it known that I, WILLIAM HOYT, of Dupont, in the county of Madison and State of Indiana, have invented a new and useful Improvement in Locomotives for Ascending and Descending Inclined Planes of Steep Grades with Heavy Trains, which is described as follows, reference being had to the annexed drawings of the same, making part of this specification.

Figure 1:
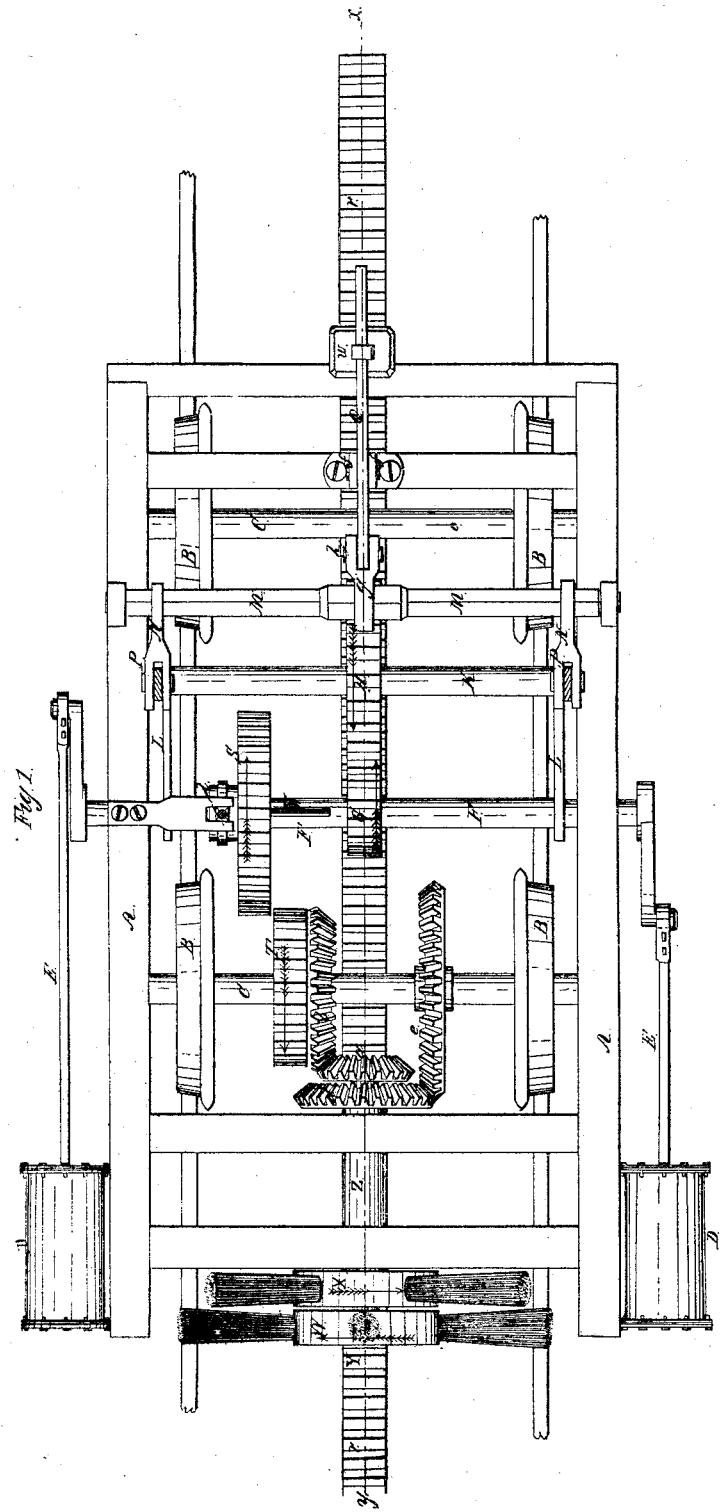
Figure 2:
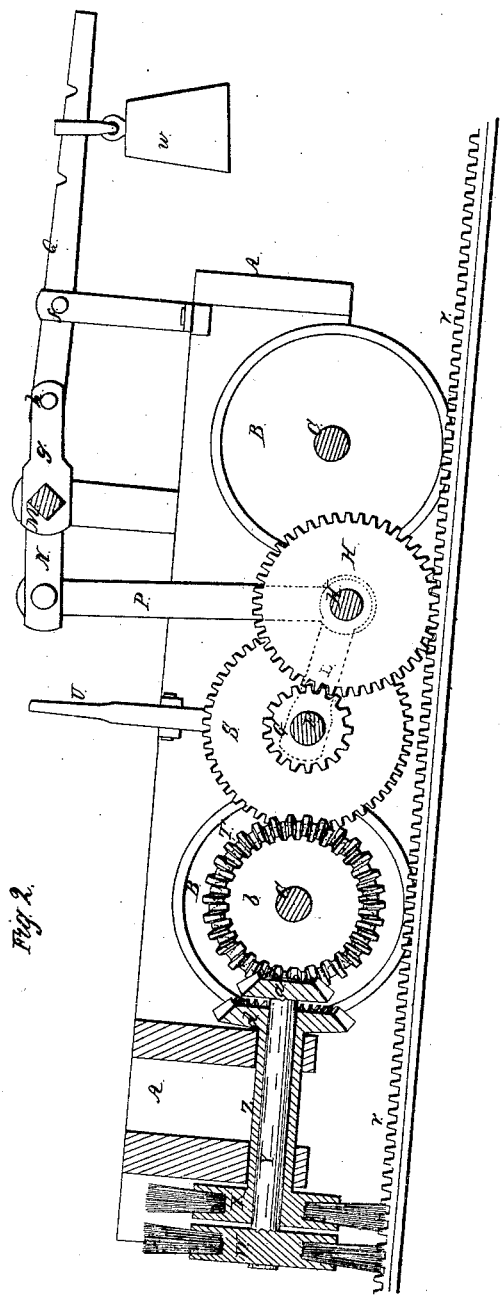

Figure 1, is a plan of the locomotive. Fig. 2 is a vertical longitudinal section on the line $x-y$, the intermediate cog wheel being in gear with the central rack.

I am well aware that locomotives have been constructed for ascending and descending inclined planes by placing cog wheels on their axles that are made to engage with racks constructed on the side, or middle, of the track at the inclined planes, and therefore I do not claim this principle, but I am not aware of any mode of construction by which an intermediate cog wheel has been used made to move in the arc of a circle scribed from the center of the cog wheel on the crank axle to which the power of steam is applied so as to conform to the unevenness or hollows and swellings in the rails of the track and thus to remain in gear with the rack, at any required degree of adhesiveness, increased, or diminished, at pleasure, by the application of lever power, steam, weight, or springs, to the axle of said intermediate wheel. Likewise I am not acquainted with any mode of locking by means of a combination of cogged wheels and cogged rack similar to that which I have constructed. I shall therefore confine my specification to those improvements.

A is a common car frame. B wheels. C axles. D are the steam cylinders. E piston rods.

F is an intermediate crank shaft to which the piston rods are attached.

G is a pinion on the crank shaft.

H is the intermediate cog wheel (which is always in gear with the pinion G) which engages with a stationary rack $r$ of the track while ascending and descending inclined planes, secured on an axle K which rises and falls in the arc of a circle, scribed from the center of the crank axle F, by which said cog wheel H is always kept in gear with the rack, however uneven it may be.

L L are two radial swinging arms attached to the crank axle and containing the boxes or bearings of the swinging axle K.

M is a rack shaft, to which the swinging axle K is connected by radial arms N and connecting rods P rocked or vibrated by a lever Q secured to said rock shaft M. Said lever being actuated by steam, weights, springs, or otherwise for increasing or diminishing the adhesiveness of the intermediate cog wheel H to the rack and for disengaging or engaging the cog wheel with the rack at pleasure.

S is a cog wheel on the crank shaft F to be brought into gear (when passing over planes or levels where there are no racks) with a cog wheel T on the axle C by sliding said cog wheel S on the shaft F by means of a lever V, the cog wheel being prevented from turning on the axle F by a feather or tongue V on the axle F entering a groove, or slit, in the cog wheel. This cog wheel is not used while ascending inclined planes. It can be thrown in or out of gear at pleasure by moving the lever U to the right or to the left. It answers as an effective lock by bringing it into gear with the cog wheel T when the intermediate cog wheel H is in gear with the rack.

W and X are two revolving brushes turning in contrary directions for brushing off the cogged rack in advance of the intermediate cog wheel operated by cogged gearing on its forward axles working into cogged gearing on the axles of the brushes.

Y is the axle of the brush W passing through the hollow axle Z of the brush X having on its inner end a bevel cog wheel $a$ into which matches a bevel cog wheel $b$ on car axle C. A similar bevel wheel $d$ is on shaft Z geared to a bevel wheel $e$ on axle C. This arrangement of gearing will cause the brushes to turn in contrary directions whether the car advances or recedes.

$f$ is the fulcrum of the lever Q. The weight for depressing the long arm of the level is marked $w$. $g$ is an arm projecting from the rock shaft M to which the lever Q is attached by a joint pin $h$.

Operation: When the locomotive arrives at the foot of the inclined plane the intermediate cog wheel H is brought into gear with the cogged rail $r$ by depressing the lever Q the locomotive will then ascend with the train. Having arrived at the summit, the lever is raised which disengages the cog wheel H from the cogged rail. The cog wheel S is then brought into gear with the cog wheel T on the axle C of the locomotive by which it is propelled forward on the plain rails. In order to lock the locomotive whilst passing up or down an inclined plain the wheels S, T, must be in the position just described and the intermediate cog wheel H must be brought into gear with the rack. Or should the intermediate wheel be in gear with the rack in descending and the cog wheel S be out of gear with the cog wheel T and it be desired to lock the locomotive it will be only necessary to bring the cog wheel S into gear with the cog wheel T.

The cogged rail may be secured permanently to the cross timbers of the track in the center thereof or in any convenient position or outside the track, or there may be two rails, one on each side of the track. On the driving shaft there may be placed a solid wheel, the periphery of which to be made of a V shape, to which may be fitted a bar of iron grooved to fit said wheel and so hung and applied as to act as a brake for arresting the motion of the locomotive by the application of sufficient force to the lever. Vibrating brooms or brushes may be used for cleaning the track arranged in front of the locomotive the necessary mechanism being so combined with the locomotive as to produce the required motions of the brooms.

The cogged rail may be kept clean by a jet of steam from the engine introduced through a small pipe brought round in front of the locomotive and applied to the rail which it will keep clean by its rushing force on leaving the pipe.

The weight of the intermediate wheel H, increased by the weight of the axle K, arms N, and rods P, will generally be sufficient to produce the required degree of friction, or adhesion to the cogged rack r; but should it not be sufficient a spring or weight may be applied to the lever in any suitable manner to depress the same in order to move the rack shaft and the parts attached to it.

The manner in which the before described combination of cog wheels and crank shaft act to lock the forward axle of the locomotive in ascending or descending inclined planes is described as follows: The sliding wheel S being of greater diameter than the pinion G will cause the propelling wheel T on the forward axle of the car, with which the wheel S matches (whose flanged wheels are of greater diameter than the cog wheels) to turn faster than the intermediate cog wheel H into which the pinion G gears. Therefore, whenever the cog wheel S is in gear with the wheel T and the intermediate cog wheel H is brought into gear with the stationary rack r and the crank shaft on which the wheels G and S are placed is turned, the wheels of the locomotive on the axle of the cog wheel T must necessarily turn and slip simultaneously on the rails of the track, as they will be caused to have a tendency to move over a greater length of rail in a given time than the intermediate cog wheel H, which must consequently produce the lock as before stated. The same effect will be produced when the intermediate wheel H is in gear with the rack and the sliding wheel S is brought into gear with the propelling wheel T. The cogs of the rack being saved from injury by the flanged wheels of the locomotive slipping on the rails of the track.

What I claim as my invention and desire to secure by Letters Patent, is—

1. The combination of the intermediate cog wheel H with the pinion G, on the propelling axle F, and the stationary cogged rail r into which the intermediate cog wheel H is made to match, or gear, when required for ascending inclined planes, said intermediate cog wheel being hung upon a movable shaft and kept in gear with the rack by means of a weight or spring; whereby difficulties arising from the inequalities in the road, or others, incident upon the use of a rack and pinion for ascending inclined planes are avoided, as herein fully set forth.

2. I also claim the mode of locking by the employment of the cog wheels S and T in combination with the pinion G and intermediate cog wheel H, and rack rail r, as described.

In testimony whereof I have hereunto signed my name before two subscribing witnesses.

WM. HOYT.

Witnesses:
Wm. P. Elliot,
A. E. H. Johnson.